United States Patent
Grant et al.

(10) Patent No.: US 9,421,807 B2
(45) Date of Patent: Aug. 23, 2016

(54) JET INK AND INK JET PRINTING PROCESS

(75) Inventors: Alexander Grant, Bath (GB); Samuel Thomas Moncur, North Somerset (GB); Nigel Anthony Caiger, Somerset (GB)

(73) Assignee: Sun Chemical B.V., Weesp (NL)

( * ) Notice: Subject to any disclaimer, the term of this patent is extended or adjusted under 35 U.S.C. 154(b) by 363 days.

(21) Appl. No.: 12/920,467

(22) PCT Filed: Mar. 2, 2009

(86) PCT No.: PCT/GB2009/000559
§ 371 (c)(1),
(2), (4) Date: Sep. 1, 2010

(87) PCT Pub. No.: WO2009/118507
PCT Pub. Date: Oct. 1, 2009

(65) Prior Publication Data
US 2011/0008547 A1  Jan. 13, 2011

(30) Foreign Application Priority Data
Mar. 26, 2008 (GB) .................................. 0805493.4

(51) Int. Cl.
*B41M 5/00* (2006.01)
*C09D 11/101* (2014.01)
*B41M 7/00* (2006.01)

(52) U.S. Cl.
CPC ............. *B41M 5/0047* (2013.01); *B41M 5/007* (2013.01); *B41M 7/009* (2013.01); *B41M 7/0081* (2013.01); *C09D 11/101* (2013.01)

(58) Field of Classification Search
CPC .. B41M 5/0047; B41M 5/007; B41M 7/0081; B41M 7/009; C09D 11/101; B05D 1/02; B05D 3/02; B05D 3/0272; B05D 3/067
USPC .......................................................... 427/500
See application file for complete search history.

(56) References Cited

U.S. PATENT DOCUMENTS

| 4,306,012 A | * | 12/1981 | Scheve ........................... 430/296 |
| 5,034,244 A | * | 7/1991 | Berrer et al. ................... 427/511 |
| 5,656,336 A | * | 8/1997 | Kamen et al. .................. 427/511 |

(Continued)

FOREIGN PATENT DOCUMENTS

| EP | 0668332 A2 | 8/1995 |
| JP | 2003-514060 | 4/2003 |

(Continued)

OTHER PUBLICATIONS

Cotton et al. "Structural Basis for the Acidity of Sulfonamides. Crystal Structures of Dibenzenesulfonamide and its Sodium Salt" J. Am. Chem. Soc. 1970, 92 (2) 294-302.*

(Continued)

*Primary Examiner* — Robert S Walters, Jr.
(74) *Attorney, Agent, or Firm* — Charles C. Achkar; Ostrolenk Faber LLP

(57) ABSTRACT

An ink jet-printable composition, which comprises a compound having a reactive silyl group and which is suitable for printing on non-porous substrates such as a glass or ceramic, and a process of decorating non-porous substrates involving ink jet printing the composition onto the substrate, exposing the printed composition to actinic or electron beam radiation to initiate curing and heating the printed composition to a temperature of at least 100° C.

17 Claims, 1 Drawing Sheet

(56) References Cited

U.S. PATENT DOCUMENTS

| | | | |
|---|---|---|---|
| 6,093,455 | A | 7/2000 | Kamen et al. |
| 6,461,419 | B1 | 10/2002 | Wu et al. |
| 6,562,172 | B1 | 5/2003 | Kamen et al. |
| 6,773,496 | B2 * | 8/2004 | Doyle et al. ............... 106/31.61 |
| 2003/0007050 | A1 | 1/2003 | Wu et al. |
| 2003/0031843 | A1 | 2/2003 | Wu et al. |
| 2004/0106707 | A1 | 6/2004 | Su et al. |
| 2006/0023043 | A1 | 2/2006 | Ishibashi et al. |
| 2007/0013757 | A1 * | 1/2007 | Ohnishi ........................ 347/102 |

FOREIGN PATENT DOCUMENTS

| | | |
|---|---|---|
| JP | 2006-037021 | 2/2006 |
| JP | 2007-002131 | 1/2007 |
| WO | WO-9906336 A1 | 2/1999 |
| WO | WO-0009332 A1 | 2/2000 |
| WO | WO-0031189 A1 | 6/2000 |
| WO | WO-0132789 A1 | 5/2001 |
| WO | WO-2004044265 A2 | 5/2004 |
| WO | WO 2005/019360 * 3/2005 ............. C09D 11/00 |
| WO | WO-2007040794 A1 | 4/2007 |

OTHER PUBLICATIONS

International Search Report, mailed May 25, 2009.
Japanese Office Action issued in counterpart Japanese application No. 2011-501284, dated Aug. 6, 2013.
Japanese Office Action issued in counterpart Japanese application No. 2011-501284, dated Sep. 9, 2014.
Korean Office Action with English language translation issued in counterpart Korean application No. 10-2010-7023835, dated Aug. 21, 2015.

\* cited by examiner

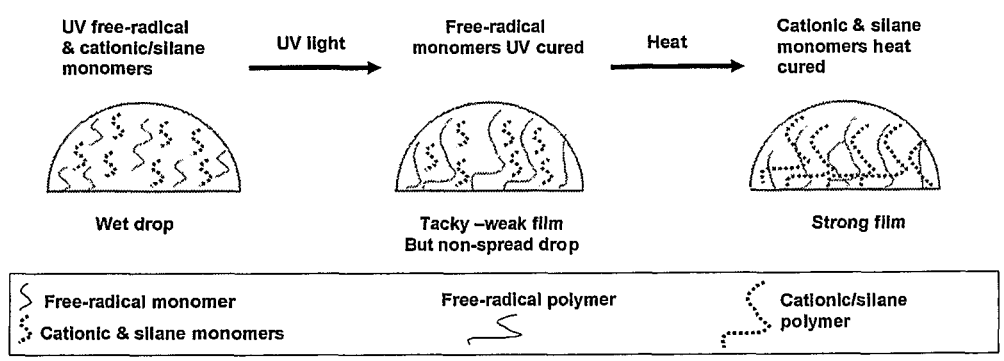

JET INK AND INK JET PRINTING PROCESS

CROSS REFERENCE TO RELATED APPLICATIONS

This application is the United States national phase filing of the corresponding international application number PCT/GB2009/00559, filed on Mar. 2, 2009, which claims priority to, and the benefit of, GB Application No. 0805493.4, filed Mar. 26, 2008, each of which applications are hereby incorporated by reference in their entirety.

FIELD OF THE INVENTION

The invention relates to an ink for use in ink jet printing (a jet ink) and an ink jet printing process. In particular, but not exclusively, this invention concerns an ink jet-printable composition suitable for printing on non-porous substrates such as a glass or ceramic and a process of decorating non-porous substrates involving ink jet printing such a composition onto the substrate.

BACKGROUND TO THE INVENTION

UV curable jet inks form durable films on many materials including plastics and paper and therefore are used in a range of graphics markets. However, on certain substrates including non-porous media such as glass and ceramics it is difficult to form a film that adheres well and provides adequate chemical and scratch resistance properties. The term "film" used herein refers both to printed coatings and printed images. Traditionally glass and ceramic substrates have been decorated using compositions including a glass or ceramic frit which facilitates the fusing of the composition onto the surface of the substrate when exposed to high temperatures. However, compositions comprising a standard particulate frit are not generally suitable for ink jet printing.

There remains a need for an ink jet-printable composition that forms a film that adheres well and provides adequate chemical and scratch resistant properties on glass and ceramic substrates.

BRIEF DESCRIPTION OF THE DRAWINGS

FIG. 1 illustrates a two-stage curing process according to an exemplary embodiment of the present invention.

DESCRIPTION OF THE INVENTION

The present invention provides a process of decorating a non-porous substrate, and in particular a glass or ceramic substrate, comprising the steps of:
a) ink jet printing a composition comprising a compound having a reactive silyl group and, optionally, a photoinitiator onto the substrate;
b) exposing the printed composition on the substrate to actinic or electron beam radiation to initiate curing; and
c) heating the printed composition on the substrate to a temperature of at least 100° C.

On exposure of the printed composition to actinic or electron beam radiation in step b), some of the reactive groups that are present in the composition cure to form a partially cured composition. The partial curing of the composition advantageously fixes the composition to the substrate. Then, on exposure to heat in step c), the partially cured composition preferably hardens due to the curing or further curing of reactive groups. Thus, the composition is cured on exposure to a combination of actinic or electron beam radiation in step (b) and thermal radiation (heat) in step (c). The compositions of the invention that cured on exposure to radiation (as opposed, for example, to the curing on evaporation of a solvent or solidifying on cooling) are sometimes known as "radiation-curable" compositions.

The invention also provides a radiation-curable ink jet-printable composition suitable for use in the process of the invention. In particular, the invention provides an ink jet-printable composition suitable for decorating a glass or ceramic substrate, wherein the composition comprises a compound having a reactive silyl group; the composition is curable by exposure to electron beam or actinic radiation; and the composition is curable further by exposure to a temperature of at least 100° C. Thus curing is advantageously initiated by exposure of the printed composition on the substrate to actinic or electron beam radiation, for example to partially cure the composition, and further cured by subsequent exposure to a temperature of at least 100° C., which may, for example, further harden the composition. The invention further provides an ink jet-printable composition comprising a compound having a reactive silyl group and a polymerisable monomer that does not include a reactive silyl group.

It has been found that if a curable ink jet-printable composition comprising a compound having a reactive silyl group is printed on a non-porous substrate, such as a glass or a ceramic, is exposed to electron beam or actinic radiation and then heated, a printed image that adheres to the substrate well and provides adequate chemical and scratch resistant properties is produced. It has also been found that the inclusion of a polymerisable monomer that does not include a reactive silyl group facilitates the fixing of the printed composition to the substrate in initial curing step b).

The ink jet-printable composition may be a photocurable composition. The composition may include a photoinitiator. The photoinitiator may be activated on exposure to actinic radiation in step (b) generating free radical or acidic species which initiate a free radical or cationic polymerisation reaction. Advantageously, the actinic radiation is light and preferably UV light.

Advantageously the ink jet-printable composition comprises compounds having a reactive silyl group in an amount of at least 5% by weight of the total composition, preferably, at least 8% by weight of the total composition and more preferably at least 10% by weight of the total composition. It has been found that the presence of a compound having a reactive silyl group in the ink jet-printable composition may be advantageous in enabling a hard, resistant film with adequate adhesion to non-porous substrates to be formed in the process of the invention. Advantageously, the composition comprises compounds having a reactive silyl group in an amount of no more than 80% by weight of the total composition. Optionally, the composition comprises compounds having a reactive silyl group in an amount of no more than 60% by weight of the total composition, for example no more than 50% by weight of the total composition. In some embodiments, the composition comprises compounds having a reactive silyl group in an amount of no more than 40% by weight of the total composition. It has been found that the presence of significant levels of other polymerisable monomers that do not include reactive silyl groups, such as free radically-curable monomers, can be advantageous in some compositions of the invention and therefore the inclusion of high amounts of compounds containing a reactive silyl group may be not beneficial in some embodiments.

A "reactive silyl group" is a labile group attached to a silicon atom. Labile groups are any hydrolysable groups and hydrogen. Reactive silyl groups are typically groups including reactive Si—O bonds, such as reactive acyloxysilyl and alkoxysilyl groups. Other examples of reactive silyl groups are silyl halide groups such as silyl chloride groups that include reactive Si—Cl bonds. Preferred compounds having a reactive silyl group include monofunctional silane compounds, difunctional silane compounds and trifunctional silane compounds. Difunctional silanes include two reactive Si—O bonds either on a single silicon atom such as compounds including dialkoxysilane moieties or on two separate silicon atoms. Trifunctional silanes include three reactive Si—O bonds either on a single silicon atom such as compounds including trialkoxysilane moieties or on two or more separate silicon atoms. The compound having a reactive silyl group may have more than three reactive silyl groups, for example, four or six reactive silyl groups. Examples of compounds having more than three reactive silyl groups include tetraalkoxysilanes, hexaalkoxydisilanes, tetrakis(alkoxy, alkoxy)silanes and bis(trialkoxysilyl)alkanes. Especially preferred compounds having a reactive silyl group are monofunctional silanes, which are compounds with a single reactive silyl group. Suitable compounds with a single reactive silyl group include alkoxytrialkylsilanes, hydroxytrialkylsilanes and acyloxytrialkylsilanes. Alkoxytrialkylsilanes are particularly preferred. Particularly preferred compounds having a reactive silyl group include ethoxytrimethylsilane, glycidoxypropyltrimethoxysilane and methyltrimethoxysilane. For the avoidance of doubt, silicon-containing compounds that do not include reactive silyl groups, such as polymeric silicon-containing species including polysiloxanes (also known as silicones), which include polymeric chains of —Si(R)$_2$—O— units where R is alkyl or aryl, are not compounds having a reactive silyl group according to the present invention.

In addition to the reactive silyl groups, the composition may, optionally, comprise polymerisable groups that are not reactive silyl groups (herein after "polymerisable groups"). The polymerisable groups may, optionally, be present in the compound comprising the reactive silyl group and/or in any optional polymerisable monomers that do not include a reactive silyl group that are present in the composition. Preferably, the polymerisable group is capable of polymerisation by a cationic or free radical polymerisation mechanism. Polymerisable groups that can be polymerised by a cationic polymerisation mechanism include cyclic ester, cyclic carbonate, oxetane and epoxide functional groups. Polymerisable groups that can be polymerised by a free radical mechanism include ethylenically unsaturated groups, such as acrylates.

Advantageously, the compound having a reactive silyl group further comprises a polymerisable group which is not a reactive silyl group. Thus, the compound including a reactive silyl group may, optionally, itself be a polymerisable monomer. Preferred, polymerisable groups present in a compound having a reactive silyl group are reactive groups that are capable of polymerisation by a cationic polymerisation mechanism. Preferably, the polymerisable group present in the compound having a reactive silyl group is an epoxide functional group. The compound having a reactive silyl group may, optionally, be an epoxy-terminated silane. Glycidoxyalkyltrialkoxysilanes are particularly preferred.

The reactive silyl group may, optionally, be curable in step b) and/or in step c). Preferably, the reactive silyl group cures in step c). The reactive silyl groups typically react under acidic conditions via cationic intermediates and thus are acid-curable groups. The reactive silyl group may cure by cross-linking with other reactive silyl groups, acid-curable polymerisable groups present in the compounds having a reactive silyl group or by cross-linking with acid-curable polymerisable groups in any optional cationically-curable polymerisable monomers that do not include reactive silyl groups present in the composition. The polymerisable groups are advantageously cured or partially cured in step b). In one embodiment, on exposure of the printed curable composition to actinic or electron beam radiation in step b) at least some of the polymerisable groups polymerise and then, on exposure to heat in step c), the compositions harden due to the curing of the reactive silyl groups.

Advantageously, printing step a) is followed directly by partial cure step b) which is followed directly by the post-cure heating step c). Further steps may be present between each of steps a) to c). In heating step c), the composition is advantageously maintained at the required elevated temperature for a duration of at least 5 minutes, preferably for a duration of at least 10 minutes and more preferably for a duration of at least 20 minutes. It has been found that maintaining the composition at the elevated temperature for at least 5 minutes is often sufficient to harden in the printed film in the post-cure heating step. However, in some applications exposure to heat for longer periods has been found to be advantageous, especially in embodiments in which the composition is fused into the surface of the substrate.

Advantageously, the printed composition is heated in step (c) to a temperature of at least 140° C. Temperatures in excess of 140° C. have been found to be particularly effective in curing the cationically curable components of the ink including reactive silanes without requiring the presence of an acid generating catalyst.

Advantageously, the composition comprises a colorant. The presence of a colorant enables a printed image or coloured coating to be formed on the substrate. The colorant may, optionally, be an organic pigment or an inorganic pigment. In some embodiments, the colorant is an inorganic pigment. Suitable inorganic pigments include metal oxides. Inorganic pigments can be resistant to high temperatures (for example, temperatures in excess of 400° C.) and thus are particularly suited to applications where the printed composition is to be exposed to high temperature either in the post cure heating step or during use of the final printed article. Inorganic pigments are especially preferred for printing on ceramic substrates. In some embodiments, the colorant is an organic colorant, preferably an organic pigment. Organic pigments provide a wider range of colours than inorganic pigments and thus may be preferred for applications in which the printed composition is exposed to only to relatively moderate temperatures.

The present invention further provides a process of decorating a non-porous substrate, in particular a glass or ceramic substrate, comprising the steps of:
  a) ink jet printing a composition comprising a compound having a reactive silyl group and, optionally, a photoinitiator onto the substrate;
  b) exposing the printed composition on the substrate to electron beam or actinic radiation to initiate curing; and
  c) heating the printed composition on the substrate to a temperature of at least 100° C. but less than 400° C.

In one embodiment, decorated articles that are suitable for less demanding applications, such as indoor applications, are produced by the process of the invention and/or using the compositions of the invention. For example, decorated glass partition panels, shower doors and the like can be produced in this embodiment. Decorated ceramic articles such as tiles for indoor use or crockery can also be produced in this embodiment. In this embodiment, the decorated articles are generally not exposed to particularly harsh conditions such as weathering and extremes of temperature. Accordingly, the cured printed composition does not need to withstand harsh conditions. It has been found that post cure heating at moderate temperatures, such as from 100° C. to 400° C. is sufficient to provide a cured printed composition of adequate adherence to ceramic and, in particular glass substrates, thus providing adequate chemical and scratch resistant properties for articles for less demanding applications such as indoor use. It has been found that post cure heating at temperatures in excess of 400° C. is not generally required for printed compositions used on articles intended for indoor use. Advantageously, the post cure heating is at temperatures of less than 350° C., preferably, less than 300° C. and more preferably less than 250° C. Using high temperatures in a post cure heating step in a process of decorating articles for less demanding applications is not preferred as it is relatively expensive to heat printed articles to high temperatures and the range of colorants available for use at higher temperatures is more limited.

Temperatures in excess of 400° C. and in particular temperatures of from about 600° C. have been found to enable the printed compositions to fuse onto the surface of some substrates and in particular into the surface of glass substrates. In one embodiment, the printed composition is heated in step (c) to a temperature of at least 400° C., preferably to a temperature of at least 500° C. and more preferably to a temperature of at least 600° C. At such temperatures it has been found that most organic substances, including organic polymers that were present to fix the composition on the substrate in the initial curing step, are burnt off leaving only inorganic residues which are typically fused into the surface of the substrate. The inorganic residues may include silicates and other silicon-containing substances derived from the compounds including reactive silyl groups present in the printed compositions and also substances derived from the inorganic pigments. It is speculated that the compounds including reactive silyl groups act as substitute for a frit enabling the resides to fuse onto the surface of the substrate. The printed composition may, optionally, be heated in step c) in a two stage process in which the composition is initially heated in a first stage to a temperature in excess of 100° C. that is sufficient to cure the composition and then heated in a second stage, for example, to a temperature sufficient to fuse the composition onto the surface of the substrate.

In one embodiment, the invention provides a process of decorating a glass substrate, comprising the steps of:
 a) ink-jet printing a composition comprising a compound having a reactive silyl group and, optionally, a photoinitiator onto the substrate;
 b) exposing the printed composition on the substrate to electron beam or actinic radiation to initiate curing; and
 c) heating the printed composition on the substrate to a temperature of at least 400° C. but less than 800° C.

Decorated articles comprising a glass substrate that are formed in this embodiment are particularly suited to relatively demanding applications such as outdoor applications where the decorated articles are subject to weathering. Temperatures in excess of 400° C. and less than 800° C., especially temperatures of about 600° C. to about 700° C. are particularly suitable for processes of decorating glass articles. Temperatures in excess of 400° C. and especially in excess of about 600° C. result in inorganic constituents of the printed substance becoming fused onto the surface of the glass substrate. Materials that are fused onto the surface of the glass become integrated into the glass material and thus are permanently fixed. Temperatures in excess of about 700° C. and in particular in excess of 800° C. are unsuitable for most processes involving glass substrates as the integrity of many glass substrates is compromised at such high temperatures.

Temperatures in excess of 1000° C. and in particular temperature of from about 1200° C. to have been found to enable the printed compositions to fuse onto the surface of some substrates and in particular into the surface of ceramic substrates. In one embodiment, the printed composition is heated in step (c) to a temperature of at least 800° C., preferably to a temperature of at least 1000° C. and more preferably to a temperature of at least 1100° C.

In one embodiment, the invention provides a process of decorating a ceramic substrate, comprising the steps of:
 a) ink-jet printing a composition comprising a compound having a reactive silyl group and, optionally, a photoinitiator onto the substrate;
 b) exposing the printed composition on the substrate to actinic or electron beam radiation to initiate curing; and
 c) heating the printed composition on the substrate to a temperature of at least 800° C.

Decorated articles comprising a ceramic substrate that are formed in this embodiment are particularly suited to relatively demanding applications such as outdoor applications where the decorated articles are subject to weathering and high temperature applications. Temperatures in excess of 800° C. and especially temperatures in excess of 1100° C. are particularly suitable for processes of decorating ceramic articles. Temperatures in excess of 800° C. and especially in excess of about 1100° C. result in inorganic constituents of the printed substance becoming fused onto the surface of the ceramic substrate. Materials that are fused onto the surface of the ceramic become integrated into the ceramic material and thus, are permanently fixed.

In addition to the compound having a reactive silyl group, the composition may, optionally, include a polymerisable monomer that does not include a reactive silyl group. The polymerisable monomer that does not include reactive silyl group may, optionally, be a cationically-curable monomer, which is polymerisable by a cationic mechanism. Advantageously, the cationically-curable monomer that does not include reactive silyl group is present in a level of at least 10% by weight of the total composition, more preferably at least 20% by weight of the total composition and especially at least 30% by weight of the total composition. The cationically-curable monomer that does not include reactive silyl group may include a cyclic ester, cyclic carbonate, oxetane or epoxide functional group. Preferred cationically-curable monomers include dioxetane, oxetane, propylene carbonate, butyrolactone, caprolactone and cycloaliphatic epoxide resins such as 3,4-epoxycyclohexylmethyl-3,4-epoxycyclohexane carboxylate (Cyracure® UVR-6105) and bis(3,4-epoxycyclohexyl)adipate (Cyracure® UVR-6128).

Preferably, the composition comprises an epoxy monomer containing an epoxide functional group. The composition may, optionally, comprise a soft epoxy monomer. The composition may, optionally, comprise a hard epoxy monomer. Advantageously, the composition comprises both hard and soft epoxy monomers. Preferably, the composition comprises epoxy monomers of amounts of at least 10% by weight of the total composition, more preferably at least 20% by weight of the total composition and especially at least 30% by weight of the total composition. The composition advantageously comprises at least 10% by weight of the total composition soft epoxy monomers and at least 10% by weight of the total composition hard epoxy monomers. Soft epoxy monomers cure to provide flexible polymers with a flexible backbone, for example, comprising a long ether linker. Hard epoxy monomers cure to provide hard, inflexible polymers. An example of a hard epoxy monomer is UVR-6105. An example of a soft epoxy monomer is UVR-6128. Other examples will be known to the person skilled in the art. Preferably, the composition comprises an epoxy monomer that contains a reactive silyl group. The composition may, optionally, comprise an epoxy monomer that does not include reactive silyl group. The composition may, optionally, comprise a vinyl ether monomer. Vinyl ether and/or oxetane monomers may be present in order to achieve a low viscosity (for example of less than 50 cPs at 25° C.).

The invention further provides a process of decorating a non-porous substrate, and in particular a glass or ceramic substrate, comprising the steps of:
  a) ink jet printing a composition comprising a free radical-curable monomer and a compound having a reactive silyl group onto the substrate;
  b) exposing the printed composition on the substrate to actinic or electron beam radiation to polymerise the free radical-curable monomer; and
  c) heating the printed composition on the substrate to a temperature of at least 100° C.

The invention further provides an ink jet-printable composition comprising a compound having a reactive silyl group, optionally, a free radical photoinitiator and a free radical-curable monomer. Preferably, the free radical-curable monomer does not include a reactive silyl group. Embodiments of the invention that include a free radical-curable monomer have been in many cases found to benefit from the ease of use of a free radical-curable composition including their good pot-life and also the superior adhesion, hardness and chemical resistance provided by cationically-curable compositions. The composition may, for example, comprise free radical-curable monomers in an amount of at least 20% by weight of the total composition, for example, at least 40% by weight of the total composition. In some embodiments, the composition may, for example, comprise free radical-curable monomers in an amount of at least 50% by weight of the total composition. Typically the free radical-curable monomer is an ethylenically unsaturated monomer. The free radical-curable monomer may, optionally, comprise an ethylenically unsaturated monomer selected from the group consisting of acrylate monomers, methacrylate monomers, vinyl monomers, for example, N-vinyl caprolactam or N-vinyl pyrrolidone, and styrenes. Preferably the free radical-curable monomer is selected from the group consisting of acrylates and methacrylates. It has been found that most free radical-curable monomers are cured fully by free radical mechanisms. However, it has been found that certain free radical-curable monomer do show a benefit in film performance, for example greater hardening, when a post-cure heating step is used. Preferred free radically curable monomers are those in which film performance is enhanced a post cure heating step. An example of a free radical-curable monomer in which film performance is enhanced with a post cure heating step is CTFA (cyclic trimethylolpropane formal acrylate).

Advantageously, the composition comprises a free radical photoinitiator. The free radical photoinitiator is a compound that generates free radicals on exposure to actinic radiation, and in particular UV light, to initiate a free radical curing reaction. Advantageously, the free radical photoinitiator is present in an amount greater than 0.1% by weight based on the total weight of the composition, preferably in an amount greater than 0.5% by weight based on the total weight of the composition and more preferably in an amount greater than 1% by weight based on the total weight of the composition. Advantageously, the free radical photoinitiator is present in an amount less than 10% by weight, preferably less than 5% by weight, based on the total weight of the composition. Suitable free radical photoinitiators will be known to the skilled person. The ink jet-printable composition may, optionally, be cured in step (b) using electron beam radiation. Exposure to electron beam radiation may initiate a free radical reaction thereby curing free radical-curable monomers. Thus, free radical-curable monomers present in the ink jet-printable composition may, optionally, be cured in the absence of a free radical photoinitiator. Accordingly, the ink jet-printable composition may, optionally, be substantially free of a photoinitiator.

It has further been found that the presence of a cationic photoinitiator or other acid-generating catalyst is not essential to enable the reactive silyl groups to be cured in some embodiments of the invention. For example, in embodiments in which any optional polymerisable groups present are free radical-curable and the photoinitiator is a free radical photoinitiator or the polymerisable groups are cured using electron beam radiation. The pot-life of compositions that comprise acid-generating catalysts including cationic photoinitiators is generally low as the compositions tend to partially cure over extended periods leading to an increase in viscosity. In ink jet printing processes the ability to control the viscosity of the printable composition to within a relatively narrow band is important for reliable jetting of the ink jet printing nozzles. Accordingly, compositions with a good pot-life are preferred for use with ink jet printers. Embodiments of the printable compositions of the invention, which do not include an acid-generating catalyst, have been found to have a good pot-life and so may be particularly suitable for use in ink jet printing process. Furthermore, such embodiments have been found to provide adequate scratch resistance when printed onto demanding non-porous substrates in a process that involves a post-cure heating step.

Optionally, the composition comprises acid-generating catalysts in an amount of less than 5% by weight of the total composition, for example, less than 0.2% by weight. The composition may, for example, comprise acid-generating catalysts in an amount of less than 0.1% by weight. Optionally, the composition comprises no more than 0.02% by weight acid-generating catalysts. Advantageously, the composition is substantially free of an acid-generating catalyst. In one embodiment, the composition is substantially free of iodonium acid-generating catalysts. It has been found that the presence of acid-generating catalyst in quantities sufficient to effect the curing of the composition may also reduce than the pot-life of an ink jet printable composition in some embodiments. The presence of iodonium acid-generating catalyst has been found to have a particularly detrimental effect on the pot-life of some embodiments.

The term "pot-life" used herein refers to the length of time that a composition may be stored prior to use, for example, in suitable container or "pot" and in particular the time a composition may be stored in printing equipment without degrading so as to significantly impair print quality or adversely affect the printing equipment.

Advantageously, the composition contains an acidic component. An acidic component is a compound including an acidic functional group such as a carboxylic group, a phenolic group or a sulphate group. Preferably the acidic component is a polymerisable monomer. The acidic component may have an acid value within the range of from 50 to 300 mg KOH/g, for example in the range of from 100 to 200 mg KOH/g. Suitable acidic components include monofunctional acid esters such as Sartomer 9050 that has an acid value of 130-195 mg KOH/g and trifunctional acid esters such as Sartomer 9051 that has an acid value of 120-180 mg KOH/g. The presence of an acidic component has been found to assist the curing of the cationic components in some embodiments. The presence of an acidic component may increase the reactivity of the reactive silyl group. The presence of an acidic component has been found to increase the level of cross-linking between compounds containing reactive silyl groups and other components of the ink jet-printable composition. Advantageously, the composition comprises acidic components in an amount of at least 1% by weight of the total composition, preferably at least 2% by weight of the total composition, more preferably at least 5% by weight of the total composition and especially at least 8% by weight of the total composition. Advantageously, the composition comprises acidic components in an amount of no more than 20% by weight of the total composition and, preferably, no more than 15% of the total composition. High levels of acidic components (for example, amounts in excess of 20% by weight of the total composition) may decrease the pot-life of the compositions. For the avoidance of doubt, the acidic component is not an acid-generating catalyst such as a cationic photoinitiator.

In some advantageous embodiments, the ink jet printable compositions comprise significant levels of free radical-curable monomers and also significant levels of compounds having a reactive silyl group. The inks may, for example, include free radical-curable monomers in an amount of at least 30% by weight of the total composition and also compounds having a reactive silyl group in an amount of at least 10% by weight of the total composition. Preferably, free radical-curable monomers and compounds having a reactive silyl group together make up at least 60% by weight of the total composition and more preferably, make up at least 70% by weight of the total composition. In such embodiments, the compositions may, optionally, be substantially free of components that are polymerisable by a cationic mechanism that do not include a reactive silyl group.

In alternative embodiments the ink jet printable compositions may, optionally, include significant quantities of components that are polymerisable by a cationic mechanism that do not include a reactive silyl group. Components that are polymerisable by a cationic mechanism that do not include a reactive silyl group may, optionally, be included in addition to components that are curable by a free radical mechanism and the compounds that include a reactive silyl group in a hybrid cationic/free radical composition. In further embodiments the compositions may, optionally, comprise components that are polymerisable by a cationic mechanism that do not include a reactive silyl group and compounds that include a reactive silyl group in a cationic composition that is substantially free of free radical-curable monomers.

The viscosity of the composition is suitable for use in ink jet printing. Preferably, the viscosity is less than 50 mPas at 25° C. and preferably less than 35 mPas at 25° C.

Additives which may be used in conjunction with the principal components of the ink formulations of the present invention include stabilizers, plasticizers, waxes, slip aids, levelling aids, adhesion promoters, surfactants and fillers, for example as described in "The Printing Ink Manual", 5th Edition, edited by R. H. Leach et al., published in 1993 by Blueprint.

The invention will now be further described for the purpose of illustration only with reference to the specific embodiments given in Tables 1 to 6.

Epoxide 6128 is bis(3,4-epoxycyclohexyl)adipate, a cationically curable epoxide monomer that is available from the Dow Chemical Corporation of Michigan, USA under the trade name Cyracure® UVR-6128.

Epoxide 6105 is 3,4-epoxycyclohexylmethyl-3,4-epoxycyclohexane carboxylate, a cationically curable epoxide monomer that is available from Dow Chemical Corporation of Michigan, USA under the trade name Cyracure® UVR-6105.

IGM (Omnicat) BL550 is a cationic photoinitiator that is available from IGM resins of Waalwljk, the Netherlands.

ITX is isopropylthioaxanthone, a free radical photoinitiator that is available from the Abermarle Corporation of Louisiana, USA under the trade name Firstcure® ITX.

Irgastab UV-10 is a nitroxy-based stabiliser that is available from Ciba Speciality Chemicals.

GLYMO is glycidoxypropyltrimethoxysilane.

Sartomer 9050 is a monofunctional acid ester comprising methacrylate acid ester and 2-(2-ethoxyethoxy)ethyl acrylate that is available from the Sartomer Corporation of Pennsylvania, USA.

Sartomer 9051 is a trifunctional acid ester comprising methacrylate acid ester and ethoxylated trimethylolpropane triacrylate esters that is available from the Sartomer Corporation of Pennsylvania, USA.

EtMS is ethoxytrimethylsilane

CTFA is cyclic trimethylolpropane formal acrylate

TPO is 2,4,6-Trimethylbenzoylphenyl phosphineoxide that is available from Ciba Speciality Chemicals under the trade name Darocur® TPO.

Irgacure 184 is 1-hydroxy-cyclohexyl-phenyl ketone that is available from Ciba Speciality Chemicals.

Ethanox 703 is 2,6-di-tertiarybutyl-N,N-dimethylamino-p-cresol, an antioxidant that is available from the Abermarle Corporation of Louisiana, USA.

TMPO is trimethylolpropane oxetane

Tegoglide 435 is a polyalkoxy-polysiloxane surfactant available from the Goldschmidt Chemical Co. of Hopewell, Va., USA.

TABLE 1

| | Example Number | | | |
|---|---|---|---|---|
| | Comparative 1 | Comparative 2 | Comparative 3 | Example 1 |
| | | Description Code | | |
| | "Soft" cationic 57-6 | "Hard" cationic 57-1 | 50/50 blend "Soft":"Hard" Blend | Blend + silane 71-2 |
| Epoxide 6128 | 30.92 | | | 13.5 |
| Epoxide 6105 | | 27.24 | | 10.06 |
| Bis(1-ethyl(3-oxetanyl))methyl ether | | 38.5 | | 17.4 |
| Propylene carbonate | 24.69 | 10 | | 16 |
| Trimethylolpropane oxetane | 11 | | | 5 |
| Butyrolactone | 9 | | | 4 |

TABLE 1-continued

| | Example Number | | | |
|---|---|---|---|---|
| | Comparative 1 | Comparative 2 | Comparative 3 | Example 1 |
| | Description Code | | | |
| | "Soft" cationic 57-6 | "Hard" cationic 57-1 | 50/50 blend "Soft":"Hard" Blend | Blend + silane 71-2 |
| IGM BL550 | 12 | 12 | | 12 |
| ITX | 2 | | | |
| Tegoglide 435 | 0.05 | 0.1 | | 0.04 |
| Ethoxytrimethylsilane | | | | 10 |
| Cyan dispersion | 10.34 | 12.16 | | 12 |
| Total | 100 | 100 | | 100 |
| Initial viscosity in cPs at 50° C. | 12.8 | 11.8 | 12.1 | 8.5 |
| 1 week viscosity in cPs at 50° C. | 13.2 | 12.4 | 12.5 | 9.1 |

Table 1 shows the composition and viscosity of four cationically-curable ink compositions. The ink compositions of Comparative Examples 1, 2 and 3 do not include a compound having a reactive silyl group and thus are outside the scope of the present invention. Comparative Example 3 is a 50/50 mixture of the compositions of Comparative Example 1 (code 57-6) and Comparative Example 2 (code 57-7). Example 1 is a cationically-curable ink including ethoxytimethyl silane, a monofunctional silane having a single reactive silyl group. All the cationically-curable ink jet ink compositions of Table 1 include IGM BL550, a cationic photoinitiator. The viscosity of the ink compositions was found to increase slightly after 1 week when held at a temperature of 50° C.

TABLE 2

| | Example Number | |
|---|---|---|
| | Comparative 4 | Example 2 |
| | Description Code | |
| | CTFA based 72-1 | CTFA + silane 72-3 |
| CTFA | 82 | 49.2 |
| TPO | 2 | 1.2 |
| Irgacure 184 | 4 | 2.4 |
| Cyan dispersion | 12 | 7.2 |
| GLYMO | | 30 |
| Sartomer 9050 | | 10 |
| Total | 100 | 100 |
| Initial viscosity in cPs at 50° C. | 5.19 | 5.64 |
| 1 week viscosity in cPs at 50° C. | 6.7 | 7.01 |

Table 2 shows the composition and viscosity of two ink compositions that include the free radical-curable monomer cyclic trimethylolpropane formal acrylate (CTFA). Example 2 includes Satormer 9050, an acidic monomer, and glycidoxypropyltrimethoxysilane (GLYMO), a compound having a reactive silyl group and also an epoxide functional group. Thus, Example 2 is a hybrid free radical/cationic ink having both free radically-curable and cationically-curable constituents. The viscosity increase after one week of the hybrid ink of Example 2 was similar to that of the free radical-curable ink of Comparative Example 4.

The cured films of Tables 1 and 2 were tested for film properties. The results of those tests are displayed in Table 3 and 4.

TABLE 3

| Example Number | Comparative 1 | | Comparative 2 | | Comparative 3 | | Example 1 | |
|---|---|---|---|---|---|---|---|---|
| Description Code | "Soft" cationic UV 57-6 | | "Hard" cationic UV 57-1 | | 50/50 "Soft":"Hard" Blend | | Blend + silane 71-2 | |
| Cure dose (mJ/cm²) | 400 | 400 | 100 | 100 | 100 | 100 | 100 | 100 |
| Heat 150° C. 10 mins | no | yes | no | yes | no | yes | no | yes |
| Initial | | | | | | | | |
| Adhesion | Good | Very good | Very poor | Poor | Very poor | Very good | poor | Excellent |
| Scratch | Very poor | Poor | Very good | Very good | poor | Very good | poor | Excellent |
| Hardness | 5B | 3H | HB | 5H | 4B | 5H | HB | 5H |
| O/N soak Water | | | | | | | | |
| Adhesion | Poor | Very good | Poor | Poor | poor | Very good | poor | Excellent |
| EtOH rubs | 0 | 10 | 0 | 100 | 0 | 100 | 0 | >100 |
| Window cleaner rubs | 0 | 20 | 0 | >100 | 0 | >100 | 0 | >100 |
| Acetic acid rubs | 0 | 60 | 0 | >100 | 0 | >100 | 0 | >100 |
| Alkali rubs | 0 | >100 | 0 | >100 | 0 | >100 | 0 | >100 |

TABLE 4

| | Example Number | | | |
|---|---|---|---|---|
| | Comparative 4 | | Example 2 | |
| Description Code | | | | |
| | CTFA based 72-1 | | CTFA + silane 72-3 | |
| Cure dose (mJ/cm$^2$) | 100 | 100 | 100 | 100 |
| Heat 150° C. 10 mins | no | yes | no | yes |
| Initial | | | | |
| Adhesion | Poor | Excellent | Poor | Excellent |
| Scratch | Poor | Poor | Poor | Excellent |
| Hardness | | | 4B | 4H |
| O/N soak Water | | | | |
| Adhesion | | Excellent | Poor | Excellent |
| EtOH rubs | | 20 | 0 | 100 |
| Window cleaner rubs | | 40 | 0 | >100 |
| Acetic acid rubs | | 20 | 0 | >100 |
| Alkali rubs | | 10 | 0 | >100 |

The adhesion test was a cross hatch adhesion test using iso tape and was based on ASTM D-3359-97, the scratch test was a thumb nail scratch test, hardness was tested using pencils of varying hardness and the rub tests indicated the number of rubs to remove the film with EtOH (ethanol), window cleaner, acetic acid and alkali after soaking over night in water.

Tables 3 and 4 demonstrate that, following the post cure heating step the blend of cationic inks of Example 1, which includes the EtMS, and the hybrid ink of Example 2, which includes GLYMO, displayed superior properties in the film performance tests to the inks of Comparative Examples 1 to 3 and the inks of Comparative Example 4 respectively, which do not include compounds including a reactive silyl group. It is also demonstrated that the post cure heating step markedly improves the film properties of the ink compositions that include compounds including a reactive silyl group.

The inks of Table 5 were applied by a K-bar as 12 μm wet film onto a glass panels that had previously been wiped with IPA (isopropyl alcohol), fixed using UV radiation from an Fe doped Hg lamp for UV curing at a dose of 400 mJ/cm$^2$ and then heated to 150° C. for 10 minutes. The scratch and adhesions tests discussed above were repeated. Comparative Example 5 is a free radically-curable ink that does not include a compound having a reactive silyl group. The scratch resistance of the ink of Comparative Example 5 was poor despite the post cure hardening effect observed with the CTFA monomer. The inks of Examples 3 and 4 include 1:1 ratios of GLYMO to acid monomer (Sartomer 9051) and high levels of the free radically-curable monomer CTFA. The initial adhesion and scratch resistance of the cured compositions was good, however, following a water soak overnight, the scratch resistance decreased to some extent. Examples 5 to 8 include higher levels of GLYMO (30 wt %) and lower proportions of CTFA. It was found that when no or small amounts of acidic monomer were preset in Example 5 and 6, the initial scratch resistance of cured composition was not as good as in Examples 3 and 4, although no further deterioration of scratch resistance was seen following an overnight soak in water. When the level of acid monomer was increased to 5 wt % and 10 wt % in Examples 7 and 8 not only were initial scratch resistance levels comparable to Examples 3 and 4 but the scratch resistance following an overnight soak in water remained excellent. Adhesion level were excellent for all of the Examples of Table 3, however, the adhesion of Comparative Example 5 deteriorated slightly after an overnight soak in water. Accordingly, embodiments including compounds having reactive silyl groups in amounts of about 30% by weight and acidic monomers at amounts of at least 5% by weight and free radical curable monomers at amounts of at least 40% by weight were found to be particularly advantageous.

TABLE 5

| | Controls | | | Varied acid level | | | |
|---|---|---|---|---|---|---|---|
| Example Number | ComparativeExample 5 | Example 3 | Example 4 | Example 5 | Example 6 | Example 7 | Example 8 |
| Description | Free-radical control | 1:1 ratio of GLYMO:Acid | 1:1 ratio of GLYMO:Acid | 0% acid | 1% acid; 30% GLYMO | 5% acid; 30% GLYMO | 10% acid; 30% GLYMO |
| Code | 1-85-1 | 1-85-2 | 1-85-3 | 1-85-4 | 1-85-5 | 1-85-6 | 1-85-7 |
| CTFA | 83 | 63 | 73.0 | 53 | 52 | 48 | 43 |
| TPO | 2.3 | 4.5 | 4.5 | 4.5 | 4.5 | 4.5 | 4.5 |
| Irgacure 184 | 4.5 | 2.3 | 2.3 | 2.3 | 2.3 | 2.3 | 2.3 |
| Ethanox 703 | 0.2 | 0.2 | 0.2 | 0.2 | 0.2 | 0.2 | 0.2 |
| Glymo | | 10 | 5.0 | 30 | 30 | 30 | 30 |
| Sartomer 9051 | | 10 | 5.0 | 0 | 1 | 5 | 10 |
| Cyan pigment dipsersion | 10 | 10 | 10.0 | 10.0 | 10.0 | 10.0 | 10.0 |
| TOTAL | 100.0 | 100 | 100 | 100 | 100 | 100 | 100 |
| Initial viscosity 50° C. | 8.85 | 11.8 | 10.4 | 5.88 | 6.63 | 7.86 | 9.45 |
| 1 week visc 50° C. | 8.9 | 18.6 | 12.9 | 8.82 | 7.52 | 8.88 | 11.6 |
| Initial | | | | | | | |
| Adhesion | excellent | excellent | excellent | excellent | excellent | excellent | excellent |
| Scratch | poor | excellent | excellent | good | good | very good | excellent |
| O/N Soak water | | | | | | | |
| Adhesion | good | excellent | excellent | excellent | excellent | excellent | excellent |
| Scratch | poor | good | good | good | very good | excellent | excellent |

TABLE 6

| Example Number | hybrid | | | 100% cationic | |
|---|---|---|---|---|---|
| | Example 9 | Example 10 | Example 11 | Example 12 | Example 13 |
| Description | low EtmS low acid | High EtmS no acid | High EtmS low acid | low etms | low etms |
| Code | 93-2 | 93-3 | 93-4 | 93-5 | 93-6 |
| CTFA | 73.0 | 53 | 48 | 0 | 0 |
| TPO | 4.5 | 4.5 | 4.5 | 0 | 0 |
| Irgacure 184 | 2.3 | 2.3 | 2.3 | 0 | 0 |
| Ethanox 703 | 0.2 | 0.2 | 0.2 | 0 | 0 |
| Epoxide 6105 | 0 | 0 | 0 | 28.35 | 0 |
| Epoxide 6128 | 0 | 0 | 0 | 0 | 30 |
| Bis(1-ethyl(3-oxetanyl))methyl ether | 0 | 0 | 0 | 27.55 | 0 |
| Trimethylolpropane oxetane | 0 | 0 | 0 | 0 | 10.9 |
| Propylene carbonate | 0 | 0 | 0 | 10 | 16 |
| Butyrolactone | 0 | 0 | 0 | 0 | 9 |
| EtMs | 5.0 | 30 | 30 | 10 | 10 |
| Omnicat BL550 | 0.0 | 0 | 0 | 12 | 12 |
| Tegoglide 435 | 0.0 | 0 | 0 | 0.1 | 0.1 |
| Sartomer 9051 | 5.0 | 0 | 5 | 0 | 0 |
| Cyan dispersion | 10.0 | 10.0 | 10.0 | 0 | 0 |
| Black dispersion | 0.0 | 0.0 | 0.0 | 12 | 12 |
| TOTAL | 100.0 | 100.0 | 100.0 | 100.0 | 100.0 |
| Initial viscosity 50° C. | 10.4 | 5.67 | 7.23 | 9.03 | 11.7 |
| 1 week visc 50° C. | 12.1 | 6.04 | 8.31 | 8.88 | 11.7 |
| Initial | | | | | |
| Adhesion | excellent | excellent | excellent | excellent | excellent |
| Scratch | very good | very good | very good | excellent | excellent |
| O/n soak in water | | | | | |
| Adhesion | excellent | excellent | excellent | very good | excellent |
| Scratch | very good | very good | very good | excellent | excellent |

The inks of Table 6 were applied by a K-bar as 12 μm wet film onto a glass panels that had previously been wiped with IPA (isopropyl alcohol), fixed using UV radiation from an Fe doped Hg lamp for UV curing at a dose of 400 mJ/cm² and then heated to 150° C. for 30 minutes. The scratch and adhesion tests discussed above were repeated. Examples 9 to 13 all showed acceptable levels of adhesion and scratch resistance both initially and after an overnight soak in water demonstrating that both hybrid free radical/cationic inks and cationically-curable inks that include the monofunctional silane, ethoxytrimethylsilane have desirable properties.

FIG. 1 illustrates schematically the process of an embodiment of the invention. A hybrid ink jet printable composition comprising a free radical photoinitiator, a free radical-curable monomer and cationically curable components that include a compound having a reactive silyl group, for example, the ink composition of Example 7, is printed onto a non-porous substrate using an ink jet printer to form a wet drop. The wet drop is then irradiated with UV light to activate the free radical photoinitiator and cure the free radical monomers forming a tacky, weakly fixed film in which the free radical monomers have been polymerised. The tacky film is then heated to a temperature of at least 100° C. for at least 5 minutes to harden the film resulting in curing of the cationically curable components to provide a strong film.

What is claimed is:

1. A process of decorating a glass or ceramic substrate, comprising:
   a) ink jet printing a curable composition comprising (i) a compound having a reactive silyl group; (ii) a polymerizable monomer that does not include a reactive silyl group; and iii) an acidic component having an acid value of 50 to 300 mg KOH/g onto a substrate;
   b) exposing the printed composition on the substrate to electron beam or actinic radiation to initiate curing; and
   c) heating the exposed composition on the substrate to a temperature of 100° C. to 400° C. to provide a printed and cured ink;
   wherein the printed and cured ink is resistant to removal from the substrate by exposure to alkali; and
   wherein resistance to removal by exposure to alkali means that the printed and cured ink is not removed with greater than 100 alkali rubs.

2. The process of claim 1, wherein the exposed composition is heated in step (c) to a temperature of at least 140° C.

3. The process of claim 1, wherein the polymerizable monomer that does not include a reactive silyl group is a free radical-curable monomer.

4. The process of claim 1, wherein the curable composition comprises a free radical photoinitiator and the printed composition is exposed to actinic radiation in step (b) to activate the photoinitiator.

5. The process of claim 1, wherein the curable composition comprises a colorant.

6. The process of claim 5, wherein the colorant is an inorganic pigment.

7. The process of claim 1, wherein the exposed composition is heated in step (c) to a temperature of less than 400° C.

8. The process of claim 1, wherein the curable composition is free of an acid-generating catalyst.

9. The process of claim 1, wherein the curable composition comprises an epoxy monomer containing an epoxide functional group.

10. The process of claim 1, wherein the compound having a reactive silyl group has a single reactive silyl group.

11. A process of decorating a glass or ceramic substrate comprising the steps of:

a) ink jet printing a curable composition comprising a compound having a reactive silyl group, a polymerizable monomer that does not include a reactive silyl group, and an acidic component having an acid value of 50 to 300 mg KOH/g onto a substrate;
b) exposing the printed composition on the substrate to electron beam or actinic radiation to initiate curing; and
c) heating the exposed composition on the substrate to a temperature of 100° C. to 400° C. to provide a printed and cured ink, wherein the curable composition has a viscosity less than or equal to 50 cP at 25° C.;

wherein the printed and cured ink is resistant to removal from the substrate by exposure to alkali; and wherein resistance to removal by exposure to alkali means that the printed and cured ink is not removed with greater than 100 alkali rubs.

12. The process of claim 11, wherein the polymerizable monomer that does not include a reactive silyl group is a free radical-curable monomer.

13. The process of claim 11, wherein the curable composition comprises a free radical photoinitiator and the printed composition is exposed to actinic radiation in step (b) to activate the photoinitiator.

14. The process of claim 11, wherein the composition comprises a colorant, the colorant optionally comprising an inorganic pigment.

15. The process of claim 11, wherein the curable composition is free of an acid-generating catalyst.

16. The process of claim 11, wherein the curable composition comprises an epoxy monomer containing an epoxide functional group.

17. The process of claim 11, wherein the compound having a reactive silyl group has a single reactive silyl group.

* * * * *